United States Patent Office 3,639,300
Patented Feb. 1, 1972

3,639,300
SPONGE RUBBER SOLE FOR PREVENTING SLIPPAGE
Akira Takahashi, Ibaragi-ken, and Gentaro Nemoto, Ota-ku, Japan, assignors to Showa Rubber Co., Ltd., Tokyo, Japan
No Drawing. Filed Mar. 27, 1968, Ser. No. 716,308
Claims priority, application Japan, Aug. 22, 1967, 42/53,907
Int. Cl. A43b 13/22; C08c 17/08; C08d 13/08
U.S. Cl. 260—2.5 R                                               1 Claim

ABSTRACT OF THE DISCLOSURE

The present invention relates to a sponge rubber sole containing a slippage preventive additive. The rubber sole contains, for each 100 parts of rubber, 30 parts or less (5 to 30 parts, preferably 10 to 30 parts) of silicon carbide of 95 to 98% SiC content. Silicon carbide is of 100–300 mesh which is of about the same grain size as the reinforcing filler usually used in rubber and can thus be uniformly mixed with the reinforcing filler.

---

The present invention relates to improvements in sponge rubber soles for preventing slippage and to the method of manufacturing the same.

While some measures have been taken for preventing slippage of rubber soles, such as using rubber with a low hardness or improving the surface design, none of these conventional measures have given completely satisfactory results.

In the sponge rubber soles of the present invention, the prevention of slippage is obtained by adding 30 parts or less (5 to 30 parts, preferably 10 to 30 parts), against the weight of rubber, of silicon carbide (Carborundum), which contains 95 to 98% of SiC and is of 100–300 mesh. This silicon carbide has about the same grain size as that of the reinforcing filler usually used in rubber and can be uniformly mixed with said reinforcing filler.

The amount of SiC in the silicon carbide, should be 95 to 98% as such silicon carbide has particularly high hardness and good wear-resistance. On the other hand, when a product with a low SiC content is used, the silicon carbide will be easily broken out and therefore not suitable for the purpose of preventing slippage.

The precentage of silicon carbide to be added is 30 parts or less by weight for each 100 parts by weight of rubber. This provides a specific gravity of 0.5–0.8 and a hardness of 45–60 for the sponge, and gives the optimum characteristics of a sponge sole.

Basically, the shoe-sole or heel of the present invention is made entirely of secondary sponge rubber, but a part of the shoe-sole or heel, that is, only the tread portion, may be made of this sponge rubber.

An example of the present invention is shown below. The example shows a specific embodiment of the invention, but it is not intended that the invention be limited to this example.

A mixture with the following composition was subjected to a primary vulcanization at 145° C. for 15 minutes, and a secondary vulcanization at 145° C. for 15 minutes:

| | |
|---|---:|
| SBR | 100 |
| Vulcanizing agent | 2 |
| Accelerator | 2 |
| Activator | 6 |
| Reinforcing filler | 75 |
| Blowing agent (D.P.T.) | 6 |
| Silicon carbide | 20 |

A sponge rubber sole with the following characteristics was obtained:

| | |
|---|---:|
| Specific gravity | 0.60 |
| Hardness (Shore Hardness) | 52 |
| Tensile strength (kg./cm.$^2$) | 51 |
| Elongation | 350 |

What is claimed is:
1. In a sponge rubber sole or heel for preventing slippage, wherein said sole or heel contains a slippage preventing agent, the improvement which comprises that said sole or heel essentially consists of said sponge rubber and said slippage preventing agent, said slippage preventing agent being from about 5 to 30 parts of silicon carbide for each 100 parts, by weight, of sponge rubber, said silicon carbide having a particle size of about 100 to 300 mesh and containing about 95% to 98% of SiC, said sponge rubber having a specific gravity of about 0.5 to 0.8 and a hardness of about 46 to 63 shore units.

References Cited
UNITED STATES PATENTS

| | | | |
|---|---|---|---|
| 2,972,593 | 2/1961 | Daly | 260—2.5 |
| 3,227,604 | 1/1966 | Morgan | 51—298 |

MURRAY TILLMAN, Primary Examiner

W. J. BRIGGS, Sr., Assistant Examiner

U.S. Cl. X.R.

36—32, 59 R; 51—298; 260—41.5 A, 722, 723